US00RE39009E

(19) United States
(12) Reissued Patent
Izumisawa

(10) Patent Number: US RE39,009 E
(45) Date of Reissued Patent: Mar. 14, 2006

(54) HAND-HELD PNEUMATIC ROTARY DRIVE DEVICE

(75) Inventor: Osamu Izumisawa, Tokyo (JP)

(73) Assignee: S.P. Air Kabusiki Kaisha, Tokyo (JP)

(21) Appl. No.: 10/310,109

(22) Filed: Dec. 4, 2002

Related U.S. Patent Documents

Reissue of:
(64) Patent No.: 6,158,528
Issued: Dec. 12, 2000
Appl. No.: 09/490,896
Filed: Jan. 27, 2000

(51) Int. Cl.
*B25B 9/00* (2006.01)
*B27F 5/02* (2006.01)

(52) U.S. Cl. ..... 173/168; 173/93.5; 173/170

(58) Field of Classification Search ..... 173/168, 173/169, 170, 171, 93.5, 218; 81/57.39, 57.26, 81/177.8; D8/61; 227/130; 181/264
See application file for complete search history.

(56) References Cited

U.S. PATENT DOCUMENTS

| | | | | |
|---|---|---|---|---|
| 2,331,874 | A | | 10/1943 | Van Sittert |
| 2,581,033 | A | | 1/1952 | Larson et al. |
| 3,270,834 | A | | 9/1966 | Bratt |
| 3,443,646 | A | | 5/1969 | Baker et al. |
| 3,827,834 | A | | 8/1974 | Kakimoto |
| 4,379,492 | A | * | 4/1983 | Hiraoka |
| 4,631,012 | A | | 12/1986 | Eckman |
| 4,839,995 | A | * | 6/1989 | Hutchins |
| 5,020,607 | A | * | 6/1991 | Sentivan |
| 5,110,030 | A | * | 5/1992 | Tanji |
| 5,131,579 | A | * | 7/1992 | Okushima et al. |
| 5,199,505 | A | * | 4/1993 | Izumisawa |
| 5,292,352 | A | * | 3/1994 | Rudolf et al. |
| 5,309,714 | A | * | 5/1994 | Putney et al. ..... 60/407 |
| 5,330,106 | A | | 7/1994 | Braun, Jr. |
| 5,377,769 | A | * | 1/1995 | Hasuo et al. |
| 5,383,771 | A | | 1/1995 | Ghode et al. |
| 5,417,294 | A | * | 5/1995 | Suher |
| 5,441,450 | A | * | 8/1995 | Fein et al. |
| 5,535,646 | A | * | 7/1996 | Allen et al. |
| 5,535,867 | A | * | 7/1996 | Coccaro et al. |
| 5,784,934 | A | * | 7/1998 | Izumisawa |
| D408,243 | S | * | 4/1999 | Izumisawa |
| 5,901,794 | A | * | 5/1999 | Schoeps et al. |
| 5,918,686 | A | | 7/1999 | Izumisawa |
| 5,992,539 | A | | 11/1999 | Lin |
| 5,992,540 | A | | 11/1999 | Smolinski et al. |
| 6,082,468 | A | | 7/2000 | Pusateri et al. |
| 6,134,973 | A | * | 10/2000 | Schoeps ..... 73/862.23 |

FOREIGN PATENT DOCUMENTS

| | | | |
|---|---|---|---|
| EP | 0372376 | * | 11/1989 |
| EP | 0 885 658 A2 | | 12/1998 |
| GB | 2 149 465 A | | 6/1985 |
| SU | 1306889 A1 | | 4/1987 |
| TW | 369981 | | 9/1999 |
| WO | WO 94/04312 | * | 3/1994 |

OTHER PUBLICATIONS

PCT/US01/02785 International Search Report from the European Patent Office dated Sep. 25, 2001, 4 pages.

* cited by examiner

*Primary Examiner*—Scott A. Smith
(74) *Attorney, Agent, or Firm*—Senniger Powers

(57) ABSTRACT

A hand-held pneumatic rotary drive tool having an adjustable exhaust. The tool has an elongate housing containing a pneumatic motor. The housing has an inlet passage for pressurized air at the rearward end of the housing and air delivery passaging for flow of pressurized air to the motor. A rotary connector on the housing at the inlet passage permits connection to an air hose. The housing also has an air exhaust passage for exhausting air from the motor. An air deflector for exhausting air exiting the exhaust passage is rotatable around the connector for deflecting exhaust air laterally outward in a selected direction away from a user holding the tool.

19 Claims, 8 Drawing Sheets

HAND-HELD PNEUMATIC ROTARY DRIVE DEVICE

Matter enclosed in heavy brackets [ ] appears in the original patent but forms no part of this reissue specification; matter printed in italics indicates the additions made by reissue.

BACKGROUND OF THE INVENTION

This invention relates generally to hand-held pneumatic rotary drive devices, and more particularly to a device of this class for driving a grinding wheel, useful as a die grinder.

Reference may be made to U.S. Pat. No. 5,535,646 issued Jul. 16, 1996 showing in FIG. 9 thereof a hand-held pneumatic rotary drive device generally of the same class as the present invention, albeit for use with a bidirectional ratchet drive for a tool.

Hand-held pneumatic rotary drive devices of the type with which this invention is concerned have a pneumatic motor for effecting driving of the instrumentality to be driven thereby, supplied with compressed air via an air hose. Flexibility of the hose permits the manipulation of the device by hand to do the work intended. This invention is especially concerned with the pneumatic circuitry involved, and more particularly with problems which have been encountered in the exhausting of air from prior devices, such as the problem of exhaust air blowing in the user's eyes (often with particles of debris in the air), exhaust air blowing up the user's sleeve, and the problem of excessive noise.

BRIEF SUMMARY OF THE INVENTION

Among the several objects of the invention may be noted the provision of a hand-held pneumatic rotary drive device with an air exhaust system such as generally to reduce or to eliminate the above-mentioned problems; the provision of such a device having means for effecting directional adjustment of the exhaust to suit different hand-held positions of the device; the provision of such a device wherein said means is compatible with a connector for a flexible hose for supplying compressed air to the device, the connector allowing swivelling of the device relative thereto; and the provision of such a device with such means which is of relatively simple and economical construction and which enables simple adjustment to select a workable direction for the exhaust.

In general, a hand-held pneumatic rotary device of this invention comprises a generally elongate housing sized and shaped to be held in the hand having a forward end and a rearward end as so held and having an axis extending longitudinally endwise thereof, and having a chamber adjacent its forward end and a pneumatic motor having a rotor rotary in said chamber on said axis, a drive shaft driven by the rotor extending out of said forward end of the housing. The housing has an inlet passage for pressurized air at its said rearward end thereof extending in generally longitudinal direction relative to said housing. An air hose connector is rotary in sealed relation to said housing on an axis extending in generally longitudinal direction relative to said housing, said connector being of tubular form having a bore for flow of pressurized air to said inlet passage, said connector being for connection of an air hose for supplying pressurized air from a source thereof to the bore of said connector and allowing swivelling of the housing relative to the hose and connector. The housing has air delivery passaging for flow of pressurized air from said inlet passage to the motor, said delivery passaging having a valve therein, and said housing has a member thereon operable by the hand holding the device for operating the valve. The housing has air exhaust passaging therein for exhausting air from the motor chamber extending from the chamber to an outlet at said rearward end of the housing located laterally outward of said connector, and an air deflector for exhaust air exiting said exhaust passaging outlet rotatable around said connector for deflecting exhaust air laterally outward in selected direction away from the user holding the device.

Other objects and features will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE PREFERRED EMBODIMENT

Figure 2:
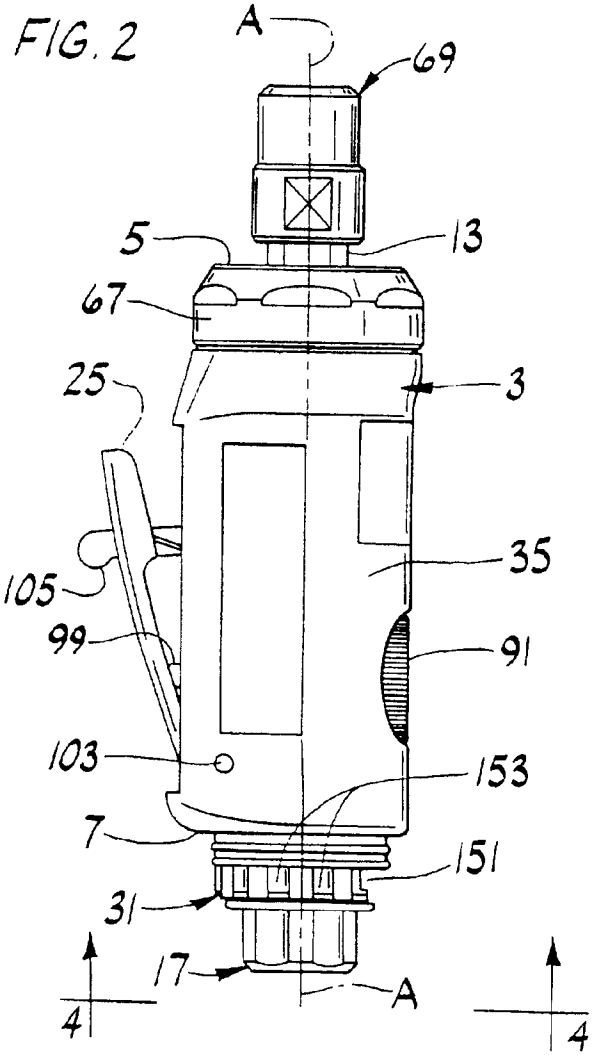
FIGS. 1, 2 and 3 are views in side elevation of a device of this invention as viewed from different sides thereof.
Figure 1:
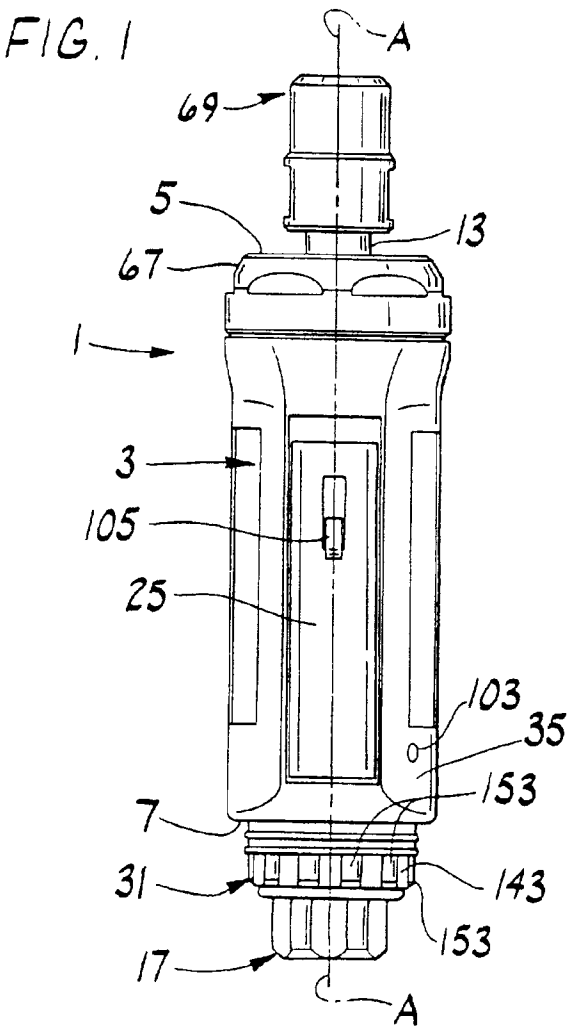
Figure 4:
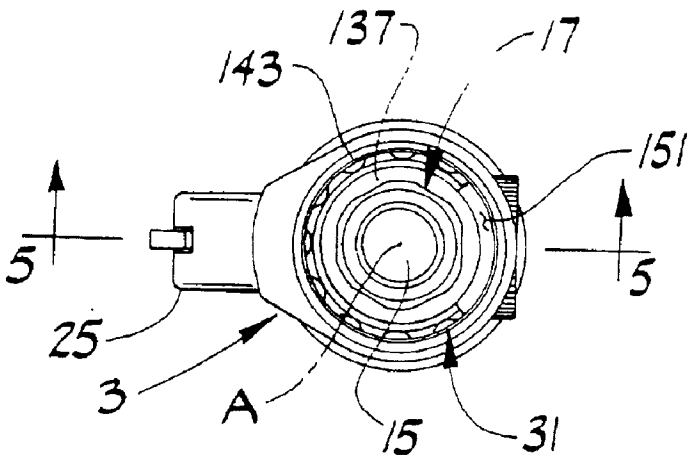
FIG. 4 is a rear end view as viewed on line 4—4 of FIG. 2.
Figure 3:
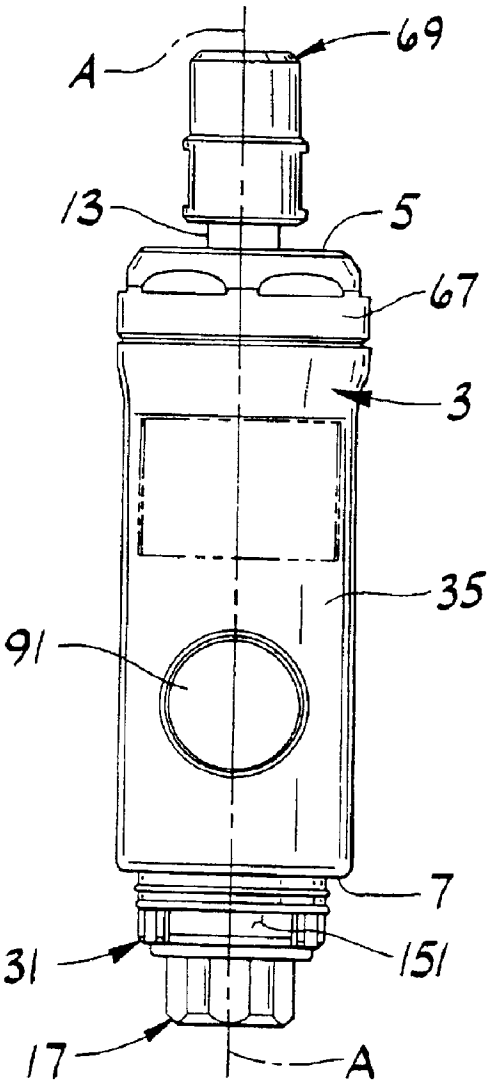

Referring to the drawings, a device of this invention, designated in its entirety by the reference numeral 1, is shown to comprise a generally elongate housing 3 sized and shaped to be held in the hand, having a forward end 5 and a rearward end 7 as so held and having an axis A extending longitudinally endwise thereof. The housing has a chamber 9 adjacent its forward end 5 and pneumatic motor M having a rotor 11 rotary in said chamber on said axis A. At 13 is indicated a drive shaft driven by the rotor 11 extending out of the forward end 5 of the housing. The latter has an inlet passage 15 for pressurized air for spinning the rotor 11 at the rearward end 7 of the housing, said passage extending in generally longitudinal direction relative to the housing, more particularly on axis A. An air hose connector 17 is rotary in sealed relation to the housing 3 on an axis extending in generally longitudinal direction relative to the housing, more particularly on axis A (coaxial with inlet passage 15). The hose connector 17 is of tubular form having a bore 19 for flow of pressurized air to said inlet passage 15. It is to be understood that the term "bore" as used herein means not only a hole formed by boring but also a hole formed in any other manner. The connector 17 is for connection of an air hose (not shown) for supplying pressurized air from a source thereof to said bore 19 and allowing swivelling of the housing 3 relative to the hose and connector.

The housing 3 has air delivery passaging indicated at 21 for flow of the pressurized air from the inlet passage 15 to the motor M for driving it, said delivery passaging having a valve 23 therein for controlling flow therethrough. For operating the valve 23, the housing 3 has a member 25 thereon, more particularly a lever, operable by the hand of the user holding the device 1. The housing has air exhaust passaging therein indicated at 27 for exhausting air from the motor chamber 9 extending from the chamber to a dual outlet comprising a pair of openings 29 at the rearward end 7 of the housing, each located laterally outward of the hose connector 17. At 31 is indicated an air deflector for the exhaust air exiting said exhaust passaging outlet openings 29 rotatable around said hose connector 17 for deflecting exhaust air laterally outward in selected direction away from the user holding the device 1 adjustable over a 3600 span.

Figure 5:
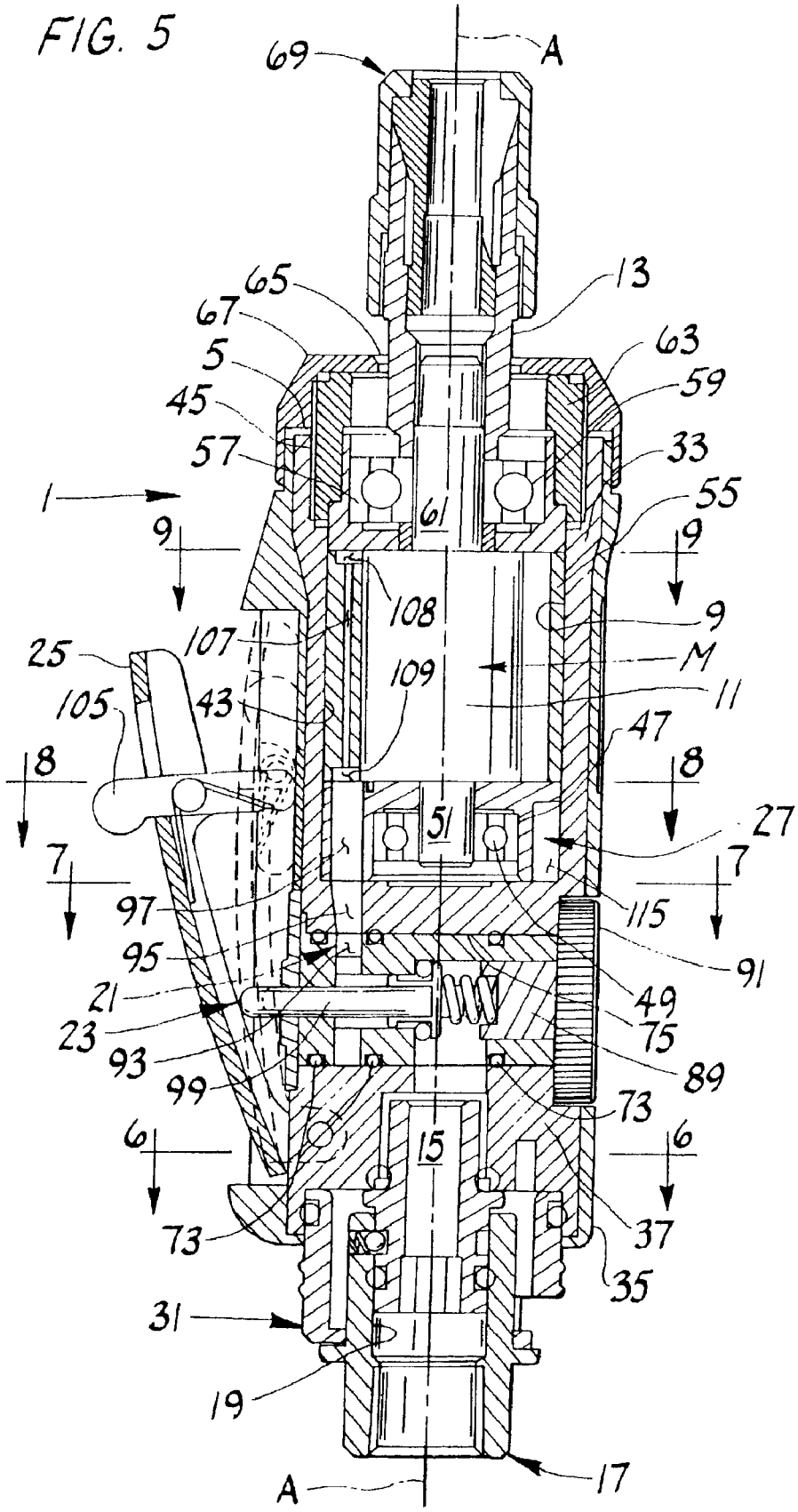
FIG. 5 is a view in longitudinal cross-section of the device taken generally on line 5—5 of FIG. 4.
Figure 6:
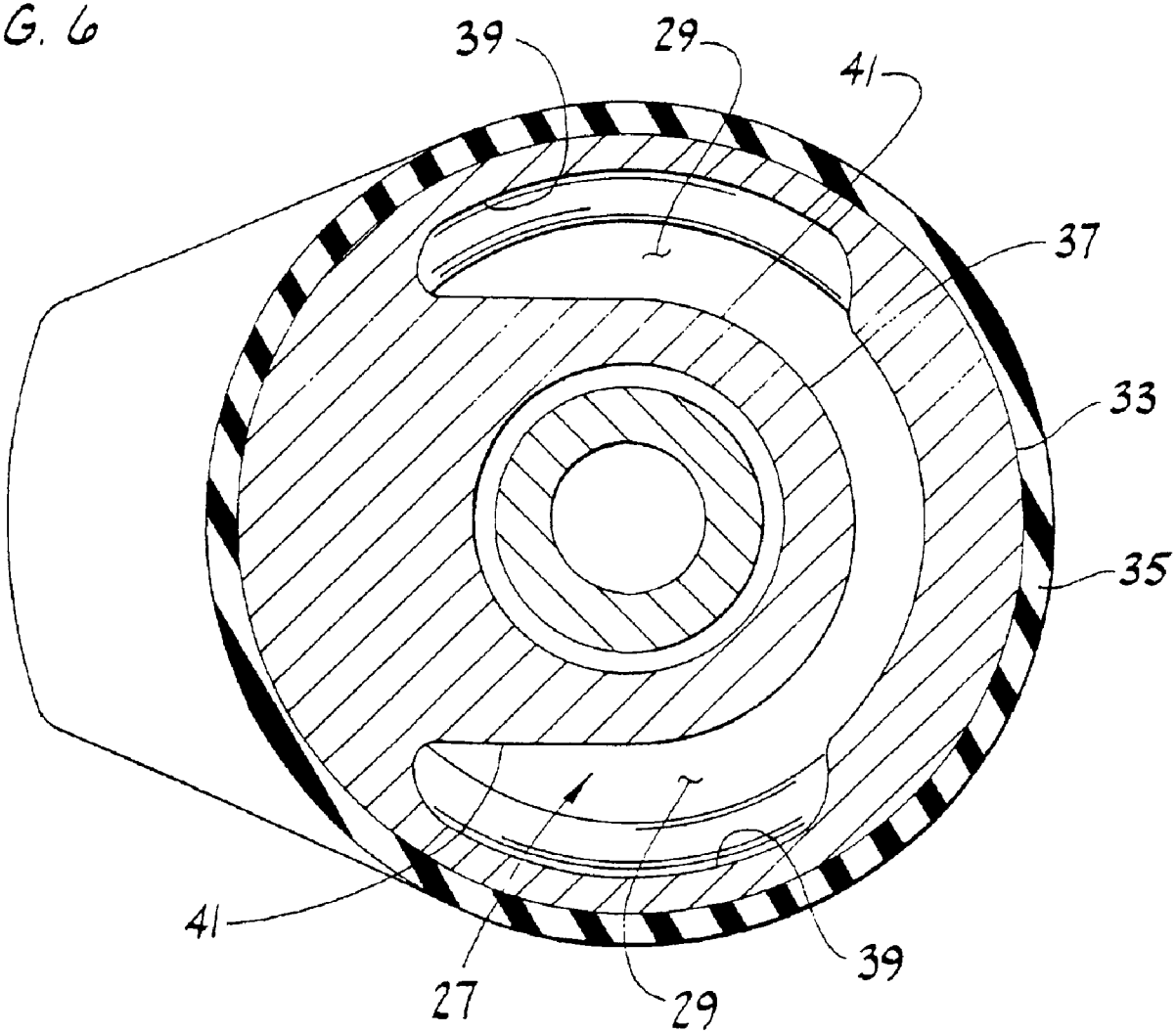
FIGS. 6, 7, 8 and 9 are views generally in transverse section taken generally on lines 6—6, 7—7, 8—8 and 9—9 of FIG. 5, on a larger scale than FIG. 5, parts being omitted and broken away in FIG. 8.
Figure 7:
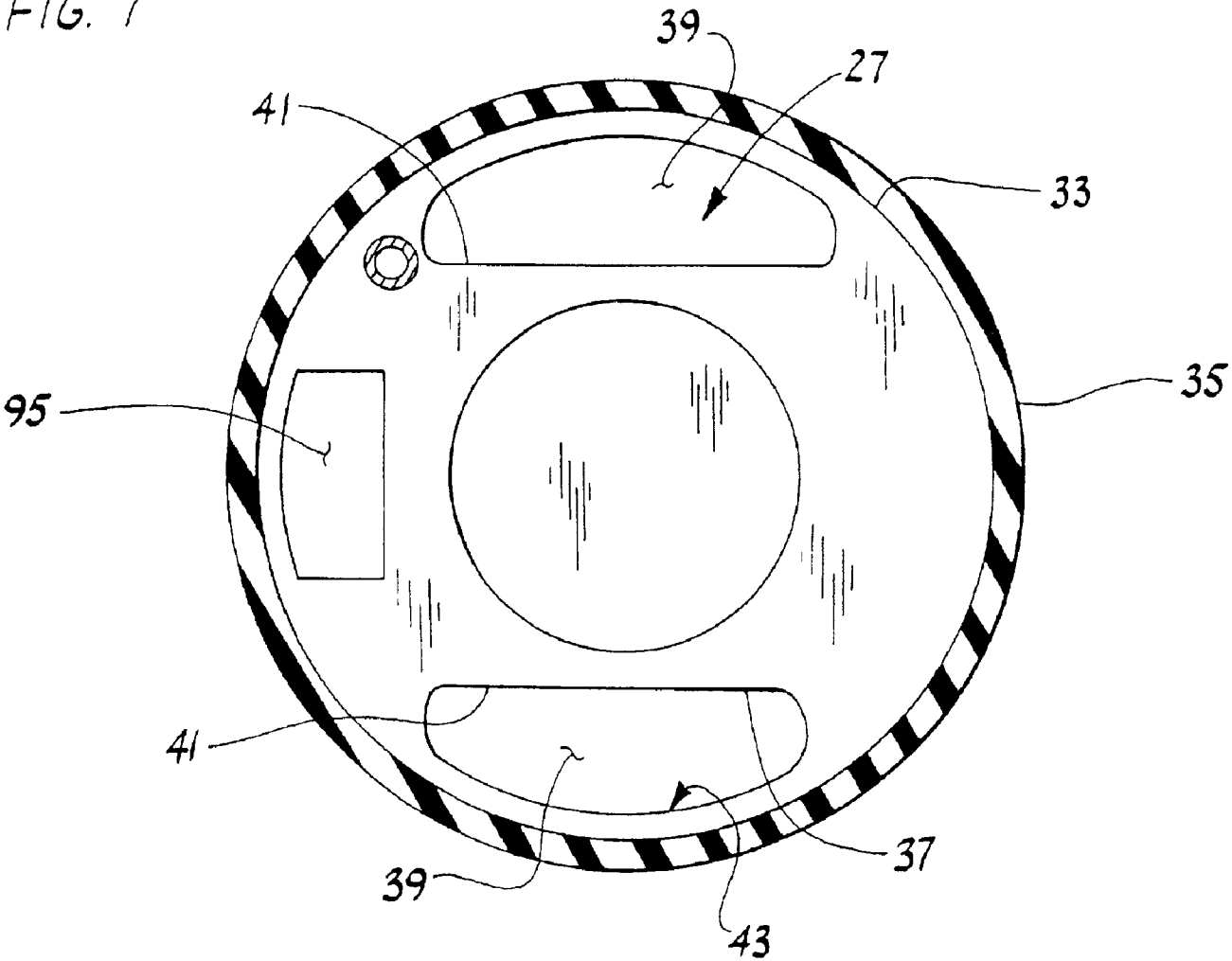
Figure 8:
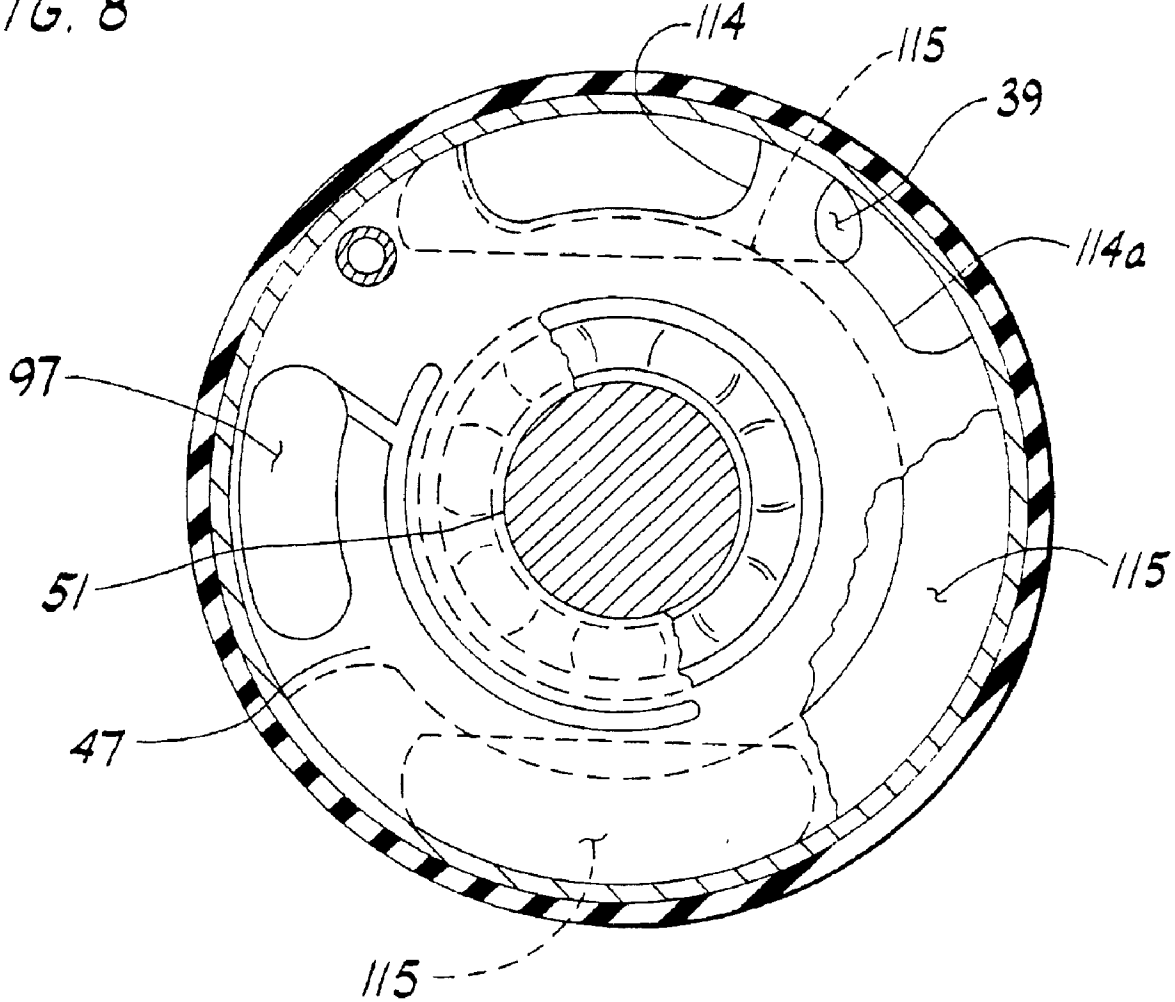
Figure 9:
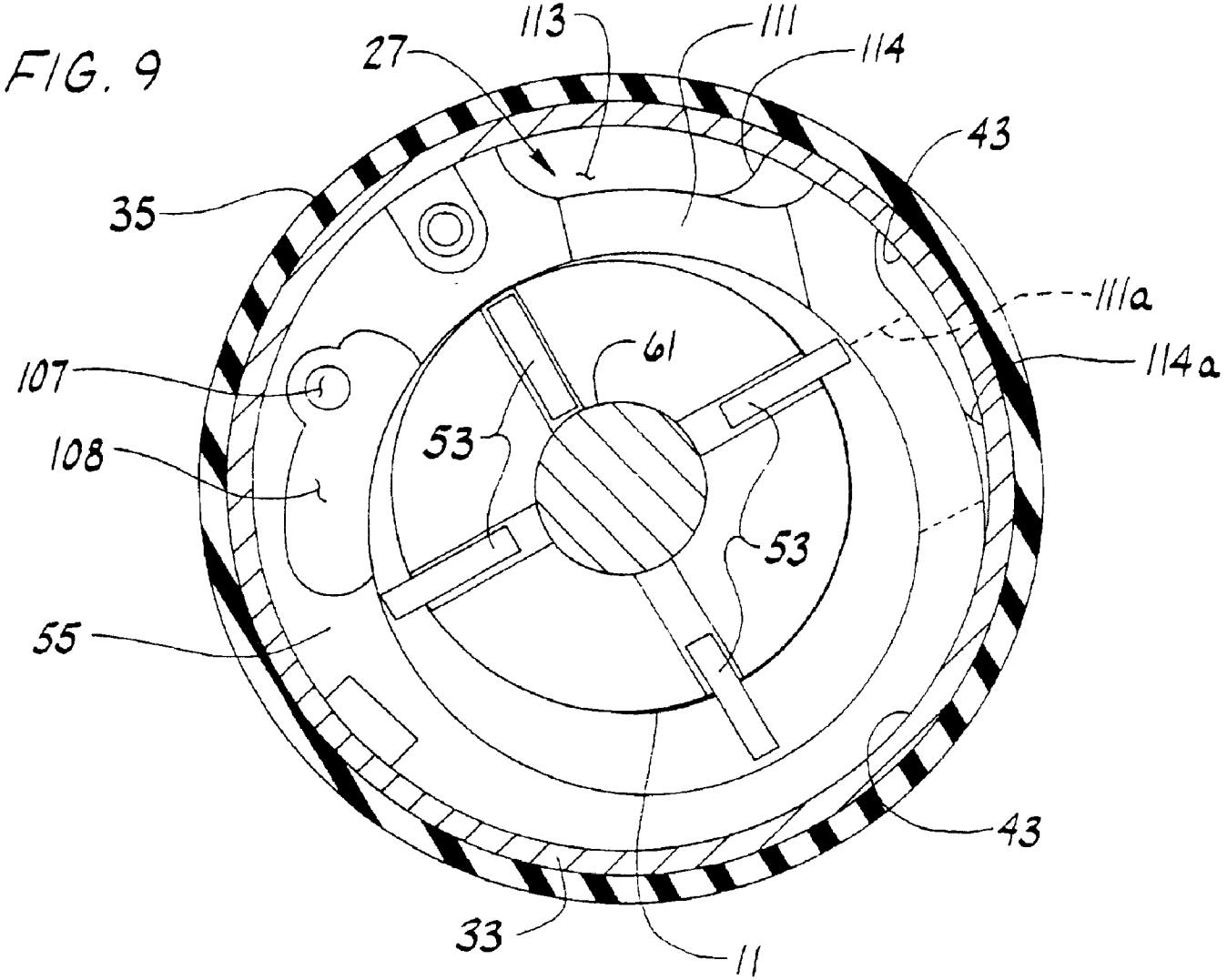
Figure 10:
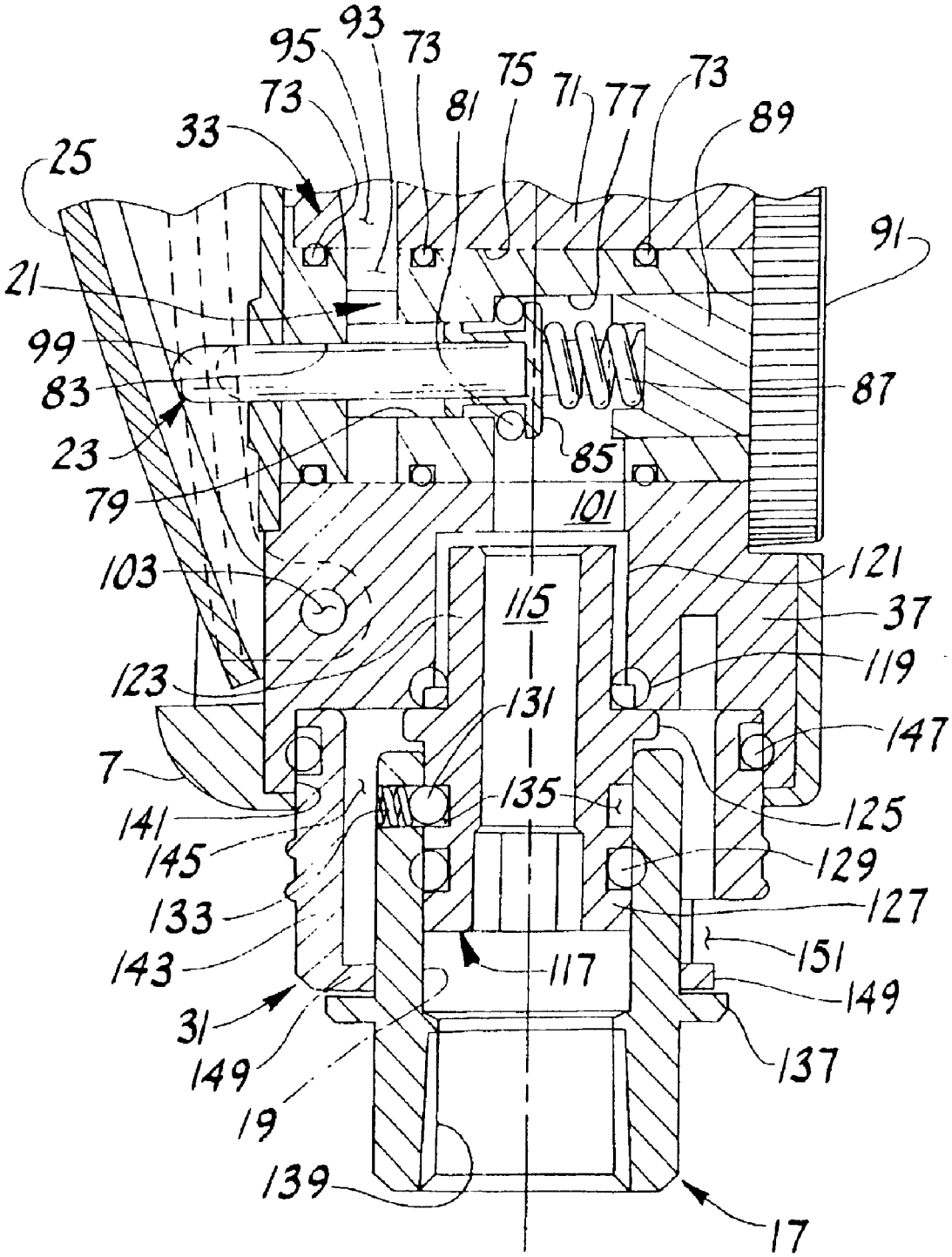
FIG. 10 is an enlarged fragment of FIG. 5.

In greater detail, the housing 3 comprises a generally cylindric tubular metal body 33 having a cover 35 of rubber or the like. The body 33 has an integral cross-block 37 extending diametrically interiorly thereof from one side to the other in the rearward part thereof, said cross-block being narrower than the inside diameter of the body, the formation of the cross-block with respect to the body being such that two openings each designated 39 (see particularly FIG. 6) are defined between the sides 41 of the cross-block and the surrounding wall of the body. Forward of the cross-block, the body 33 has a cylindric recess, designated 43 in its entirety, having a slightly enlarged forward end 45 at the forward end 5 of the body (see FIG. 5). Lodged in this recess 43 at its inner (rearward) end seated against forward face of the cross-block is a cage 47 for a ball bearing 49 for a rearward trunnion 51 of the rotor 11. The latter has the usual blades or vanes 53 (in well-known manner) for impingement thereon of the air under pressure supplied via passaging 21 for spinning it, the blades or vanes spinning around in a motor cylinder 55 fitted in the recess 43. At the forward end of the motor cylinder is a cage 57 for a ball bearing 59 (FIG. 5) for a forward trunnion 61 of the rotor 11. The ball bearing cage 57 is itself held in place by an annular retainer 63 threaded in the forward end of the body 33. Shaft 13 extends axially forward from trunnion 61 through a central opening 65 in an end rap 67 on the forward end of the body and carries means such as indicated at 69 for securement thereon of a grinding wheel or other instrumentality to be driven. The motor chamber 9 is constituted by the part of recess 43 between the ball bearing cages 47 and 57 at the ends of the motor cylinder 55. Motor M having rotors 11 and vanes 53 is generally conventional and of a type known to those skilled in the art.

The valve 23 (shown in enlargement in FIG. 10) comprises a tubular cylindrical body 71 sealed as by O-rings 73 in a transverse opening 75 extending across the body 33 in the cross-block 37. The valve body has a first bore 77, a second and smaller diameter bore 79 forming a valve seat 81 at the inner end of the first bore, and a third bore 83 of smaller diameter than the second in an end thereof toward the valve operating lever 25. At 85 is indicated a valve member biased toward closure against the valve seat by a coil compression spring 87 reacting from a plug 89 threaded in the end of the valve body 71 opposite the said third bore 83 having a knob 91 for turning the plug to adjust the bias exerted by the spring on the valve member 85. The valve body 71 has an outlet port 93 extending radially from the third bore 83 in forward direction relative to the device to a passage 95 extending through the cross-block 37 in communication with a passage 97 through the ball bearing cage 47, said passages 93, 95 and 97 constituting part of passage 21. At 99 is indicated a valve stem slidable in the third bore 83 engageable by the operating lever 25 for opening the valve 23 for flow of air entering the first bore 77 via port 101 in the valve body 71 from inlet 15 through the second bore 79 and then through passages 93, 95 and 97 to the motor M (as will appear). The lever 25 is pivoted at 103 on the body 33 and when pressed in from the retracted position in which it is shown in FIGS. 2, 4, 5 and 10 pushes the stem 99 to open the valve 23. The retracted position of the lever 25 is determined by engagement of the rearward end of the lever with the body 33. A latch for holding the lever in the retracted position is indicated at 105.

The passage 97 in the ball bearing cage 47 leads to a notch 109 in the rearward end of the motor cylinder 55. Notch 109 provides communication between the passage 97 and the interior of the motor cylinder 55. Channel 107 extends from notch 109 through the motor cylinder 55, from its rearward end to its forward end, and leads to notch 108 at the forward end of the motor cylinder. Notch 108 provides communication between passage 97, to the interior of the motor cylinder 55, at the forward end of the motor cylinder. Air exhausts from the interior of the motor cylinder 55 via a notch 111 in the forward end of the motor cylinder to a passage 113 (where the air flows rearward) between the motor cylinder and the wall of the body 33 bounding recess 43, thence through a notch 114 in the periphery of the ball bearing cage 47 to a passage 115 in the cage 47 extending in an arc part way around axis A, said passage 115 providing for flow of exhaust air to the openings 29 on opposite sides of the cross-block. Air also exhausts from the interior of the motor cylinder 55 via a notch 111a in the rearward end of the motor cylinder, thence through a notch 114a in the periphery of the ball bearing cage 47 to passage 115.

The inlet passage 15 is in a rearward extension 117 of the housing 3, this extension being of tubular form having a bore constituting said inlet passage. Extension 117 is constituted by a tubular fitting secured in sealed relation by means of an O-ring 119 in an opening 121 in cross-block 37 extending generally longitudinally of the device. The tubular fitting 117 is secured in the opening 121 by having a reduced-diameter forward section 123 threaded in the opening to the point where a flange 125 at the forward end of the larger diameter rearward section 127 of the fitting engages the rearward end of the body 33 around the opening 121 and the O-ring 119. The tubular air hose connector 17 is rotary on the tubular fitting 117, in sealed relation thereto by means of an O-ring 127. It is held on the fitting with its forward end engaging flange 125 of the fitting by having a ball detent 131 biased by a spring 133 for reception in an annular groove 135 in the fitting, the arrangement allowing rotation of the connector on the fitting. Rearward of the location of a flange 137 on the connector 17, the bore of the connector is threaded as indicated at 139 for connection of the air supply hose and the periphery of the connector rearward of the flange 137 may be hexagonal as appears in FIG. 4 for application of a wrench.

The cross-block 37 is spaced forward of the rearward end of the body 33, the formation being such that there is a generally cylindric recess 141 in the rearward end of the body. The air deflector 31 comprises a tubular member having an annular wall 143 coaxial with the air hose connector 17 surrounding the latter with an annular space 145 therebetween. Annular wall 143 is in rotary sealing engagement adjacent its forward end with the rearward end of the body 33 of housing 3, the forward end of the annular wall fitting in the recess 141 and rotatable therein with a seal provided by an O-ring 147. The annular wall 143 has an inwardly directed flange 149 at its rearward end in engagement with the annular flange 137 on the connector 17 closing off the annular space 145. Exhaust air exits from openings 29 at opposite sides of the cross-block 37 into the annular space 145 within the deflector 31, the annular wall 143 of the deflector having an opening 151 for directional lateral exhaust of the exhaust air from space 145. The annular wall 143 is externally ribbed as indicated at 153 for facilitating gripping it for being turned on the connector.

Thus, the air deflector 31 provides means for effecting directional adjustment of the exhaust to suit different hand-held positions of the device 1, compatible with the rotary hose connector 17. The stated means is of simple and economical construction and is very simply adjusted by turning it to select a workable direction for the exhaust of air via opening 151. Provision of the deflector has also been found to reduce exhaust noise.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A hand-held pneumatic rotary drive device comprising:

a generally elongate housing sized and shaped to be held in the hand having a forward end and a rearward end as so held and having an axis extending longitudinally endwise thereof;

said housing having a chamber adjacent its forward end and a pneumatic motor having a rotor rotary in said chamber on said axis;

a drive shaft driven by said rotor extending out of said forward end of the housing;

said housing having an inlet passage for pressurized air at said rearward end thereof extending in generally longitudinal direction relative to said housing;

an air hose connector rotary in sealed relation to said housing on an axis extending in generally longitudinal direction relative to said housing, said connector being of tubular form having a bore for flow of pressurized air to said inlet passage, said connector being for connection of an air hose for supplying pressurized air from a source thereof to the bore of said connector and allowing swivelling of the housing relative to the hose and connector;

said housing having air delivery passaging for flow of pressurized air from said inlet passage to the motor;

said delivery passaging having a valve therein;

said housing having a member thereon operable by the hand holding the device for operating the valve;

said housing having air exhaust passaging therein for exhausting air from the motor chamber extending from the chamber to an outlet at said rearward end of the housing laterally outward of said connector; and an air deflector for exhaust air exiting said exhaust passaging outlet rotatable around said connector for deflecting exhaust air laterally outward in a selected direction away from the user holding the device.

2. A device as set forth in claim 1 wherein said inlet passage is in a rearward extension of the housing, said extension being of tubular form having a bore constituting said inlet passage, said connector being rotary on said extension in sealed relation thereto, and said deflector being rotary on said connector.

3. A device as set forth in claim 2 wherein said extension is constituted by a fitting secured in sealed relation in an opening extending generally longitudinally in the rearward end of the housing.

4. A device as set forth in claim 3 wherein said connector has an annular flange extending outward therefrom spaced rearward of the rearward end of the housing and said deflector comprises a tubular member having an annular wall coaxial with said connector and surrounding said connector with an annular space therebetween, said annular wall being in rotary sealing engagement adjacent its forward end with the rearward end of said housing and having an inwardly directed flange at its rearward end in engagement with said annular flange on the connector closing off said space, said air exhaust passaging exiting into said space, said annular wall having an opening for directional lateral exhaust of said exhaust air from said space.

5. A device as set forth in claim 4 wherein said connector is secured on said fitting against axial movement relative thereto while being rotary on said fitting by a detent on one of said connector and said fitting received in an annular groove in the other.

6. A device as set forth in claim 5 wherein the detent is on the connector and the groove is in the fitting.

*7. A hand-held pneumatic rotary drive device comprising:*

*a generally elongate housing sized and shaped to be held in the hand having a forward end and a rearward end as so held and having an axis extending longitudinally endwise thereof, said housing having a chamber adjacent its forward end and an inlet passage for receiving pressurized air at said rearward end thereof;*

*a drive shaft;*

*a pneumatic motor having a rotor rotary in said chamber for rotating the drive shaft;*

*an air hose connector in sealed relation with said housing, said connector having a bore for flow of pressurized air to said inlet passage, said connector being for connection of an air hose for supplying pressurized air from a source thereof to the bore of said connector;*

*said housing having air delivery passaging for flow of pressurized air from said inlet passage to the motor, said delivery passaging having a valve therein and said housing having a member thereon operable by the hand holding the device for operating the valve;*

*said housing having air exhaust passaging therein for exhausting air from the motor chamber extending from the chamber to an outlet at said rearward end of the housing outward of said connector; and*

*an air deflector for exhaust air exiting said exhaust passaging outlet rotatable around said connector for deflecting exhaust air outward in a selected direction.*

*8. A hand-held pneumatic rotary drive device according to claim 7 wherein said air deflector comprises an annular wall having an opening therein to permit the passage of exhaust air outward from the housing in a selected direction.*

*9. A hand-held pneumatic rotary drive device according to claim 8 wherein the annular wall defines an annular space for receiving exhaust air from said exhaust passage.*

*10. A hand-held pneumatic rotary drive device according to claim 9 wherein said annular wall is in rotary sealing engagement adjacent its forward end with the housing, said connector having an annular flange, and said annular wall further having an inwardly directed flange at its rearward end in engagement with the annular flange on the connector closing off said annular space.*

*11. A hand-held pneumatic rotary drive device according to claim 7 wherein said connector is rotary on said housing to allow swivelling of the air hose relative to the housing.*

*12. A hand-held pneumatic rotary drive device according to claim 11 wherein said connector is secured on said housing against axial movement relative thereto while being rotary on said housing by a detent on one of said connector and said housing received in an annular groove in the other.*

*13. A hand-held pneumatic rotary drive device according to claim 7 wherein said drive shaft extends out of a forward end of said housing.*

*14. A pneumatic rotary drive device having a forward end and a rearward end, the device comprising:*

*a generally elongate housing having an axis extending between the forward end and the rearward end thereof, said housing having a motor chamber adjacent its forward end in which said pneumatic motor is located, an air hose connector in the rearward end thereof for connection of an air hose supplying pressurized air, an inlet passage within said housing for directing the flow of pressurized air from said connector to said motor chamber, and an air exhaust passage for directing exhaust air away from said motor chamber;*

*a drive shaft;*

*a pneumatic motor in the motor chamber for rotating the drive shaft; and*

*an air deflector coaxial with said housing and rotatable about said axis, for directing exhaust air outward in a selected direction, said air deflector being mounted for rotation about said connector.*

*15. A pneumatic rotary drive device according to claim 14 wherein said deflector is coaxial with said connector.*

*16. A pneumatic rotary drive device according to claim 14 wherein said air deflector comprises an annular wall having an opening therein to permit the passage of exhaust air outward from the housing in a selected direction.*

*17. A pneumatic rotary drive device according to claim 17 wherein the annular wall defines an annular space for receiving exhaust air from said exhaust passage.*

*18. A pneumatic rotary drive device according to claim 18 wherein said annular wall is in rotary sealing engagement adjacent its forward end with the housing, said connector having an annular flange, and said annular wall further having an inwardly directed flange at its rearward end in engagement with the annular flange on the connector closing off said annular space.*

*19. A pneumatic rotary drive device according to claim 17 wherein said air deflector is externally ribbed.*

* * * * *